(12) United States Patent
Kelly et al.

(10) Patent No.: US 10,731,577 B2
(45) Date of Patent: Aug. 4, 2020

(54) METHOD AND SYSTEM FOR A BOOSTED ENGINE

(71) Applicant: Ford Global Technologies, LLC, Dearborn, MI (US)

(72) Inventors: Tyler Kelly, Plymouth, MI (US); Vincent Mariucci, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 304 days.

(21) Appl. No.: 15/847,332

(22) Filed: Dec. 19, 2017

(65) Prior Publication Data

US 2019/0186390 A1 Jun. 20, 2019

(51) Int. Cl.
| | |
|---|---|
| F02D 41/00 | (2006.01) |
| F02B 37/10 | (2006.01) |
| F02B 39/10 | (2006.01) |
| F02M 35/10 | (2006.01) |
| F02B 33/40 | (2006.01) |

(52) U.S. Cl.
CPC .......... *F02D 41/0007* (2013.01); *F02B 33/40* (2013.01); *F02B 37/10* (2013.01); *F02B 39/10* (2013.01); *F02M 35/10157* (2013.01); *F02D 2200/101* (2013.01); *F02D 2200/1002* (2013.01)

(58) Field of Classification Search
CPC ......... F02D 41/0007; F02D 2200/1002; F02D 2200/101; F02B 33/40; F02B 37/10; F02B 39/10; F02M 35/10157
USPC .............................................. 60/605.1, 605.2
See application file for complete search history.

(56) References Cited

U.S. PATENT DOCUMENTS

| | | | |
|---|---|---|---|
| 6,938,420 B2 | 9/2005 | Kawamura et al. | |
| 9,695,740 B2 | 7/2017 | Xiao et al. | |
| 9,726,092 B2 | 8/2017 | Xiao et al. | |
| 2014/0208745 A1* | 7/2014 | Suhocki | F02B 37/04 |
| | | | 60/611 |
| 2017/0016388 A1 | 1/2017 | Xiao et al. | |

OTHER PUBLICATIONS

Xiao, B. et al., "Method and System for Boosted Engine System," U.S Appl. No. 15/474,813, filed Mar. 30, 2017, 78 pages.
Xiao, B. et al., "Method and System for Boosted Engine System," U.S Appl. No. 15/474,868, filed Mar. 30, 2017, 78 pages.
Xiao, B. et al., "Method and System for a Boosted Engine," U.S. Appl. No. 15/693,038, filed Aug. 31, 2017, 71 pages.
Xiao, B. et al., "Method and System for a Boosted Engine," U.S. Appl. No. 15/693,125, filed Aug. 31, 2017, 73 pages.

\* cited by examiner

*Primary Examiner* — Mark A Laurenzi
*Assistant Examiner* — Mickey H France
(74) *Attorney, Agent, or Firm* — Geoffrey Brumbaugh; McCoy Russell LLP

(57) ABSTRACT

Methods and systems are provided for improving transient performance in a boosted engine having staged air compression systems. An electric supercharger compressor is staged downstream of a turbocharger compressor in a bypass, airflow diverted from a main intake passage to the bypass via closure of a bypass valve. During selected conditions when the supercharger compressor is not being spun, the bypass valve may be closed to direct air to the engine after flowing through the supercharger in a stand-by mode, thereby enabling a transient increase in torque demand to be rapidly met.

18 Claims, 6 Drawing Sheets

METHOD AND SYSTEM FOR A BOOSTED ENGINE

FIELD

The present description relates generally to methods and systems for a boosted engine system having staged charge boosting devices.

BACKGROUND/SUMMARY

Engines may be configured with boosting devices, such as turbochargers or superchargers, to increase airflow into a combustion chamber. Turbochargers and superchargers compress intake air entering the engine using an intake compressor. While a turbocharger includes a compressor that is mechanically driven by an exhaust turbine, an electric supercharger includes a compressor that is electrically driven by a motor. In some engine systems, one or more intake charging devices may be staged in series or parallel in what may be referred to as a compound boosting configuration. For example, a fast, auxiliary boosting device (e.g., the electric supercharger) may be utilized to increase the transient performance of a slower, primary boosting device (e.g., the turbocharger). In such a configuration, the turbocharger may be upsized to increase peak power and torque performance of the engine, which enables more aggressively downsized engines.

One example of a multi-staged boosted engine is shown by Kawamura et al. in U.S. Pat. No. 6,938,420. Therein, an electric supercharger driven by an electric motor and an electric supercharger bypass valve (ESBV) are staged downstream of a turbocharger. During conditions when there is a transient increase in torque demand, and while the turbocharger compressor is not spun up, an opening of the ESBV may be adjusted to direct air flow through the electric supercharger which is rotated to provide a transient positive boost pressure. This reduces the turbo lag. Then, when the turbocharger compressor is sufficiently spun up, the ESBV opening is readjusted to redirect flow through the turbocharger while the electric supercharger is disabled, allowing the turbocharger to provide the desired boost pressure.

However, the inventors herein have recognized potential issues with such systems. As one example, adjustments to the position of the ESBV may degrade transient boosted engine performance. Specifically, the ESBV may be commanded open when the electric compressor of the electric supercharger is not active to reduce flow restrictions and thereby improve fuel economy. Then, when the electric compressor is activated, the ESBV is closed. However, communication and mechanical delay can cause a significant amount of time to be taken for the ESBV to transition between the open and the closed position. In one example, the delay may total 230 mS. This can cause a delay in the transient engine performance improvement. As another example, the frequent cycle of the bypass valve between open and closed states can expedite valve degradation. For example, the durability of the bypass valve may be affected by the frequent slamming of the valve from an open to a closed state.

In one example, the issues described above may be addressed by a method for operating a boosted engine comprising: during selected low load conditions when an electrically-driven compressor coupled to a turbine-driven compressor is not activated, commanding a bypass valve closed to direct intake air to an engine via the deactivated compressor. In this way, transient boost performance can be improved.

As one example, a boosted engine system may include an electric supercharger compressor staged downstream of a turbocharger compressor. Air flow from the turbocharger compressor may be directed through the supercharger compressor via adjustments to an opening of a bypass valve (herein also referred as the electric supercharger bypass valve or ESBV). In particular, the ESBV may be opened to flow air to the intake manifold while bypass the electric supercharger, and the ESBV may be closed to direct air through the supercharger compressor. During transient increases in torque demand, while the turbocharger compressor spools up, the ESBV may be closed while the supercharger is activated to provide a transient boost pressure. When boost does not need to be supplemented by the electric supercharger, an engine controller may compare the engine's fuel efficiency with the ESBV closed to a threshold. For example, it may be confirmed that the engine's fuel economy is above a threshold even with the air flow to the intake manifold restricted via the closing of the ESBV. If the engine's efficiency with the ESBV closed does not drop below the threshold, and additionally if the margin to choke of the supercharger compressor is not reduced by the closing of the ESBV, then the controller may maintain the ESBV closed even when the electric supercharger is deactivated. Consequently, when there is a subsequent increase in torque demand, the transient response of the boosted engine can be met by activating the electric supercharger compressor while the turbocharger compressor spools up.

In this way, delays in the activation of an electric supercharger compressor in a staged boosted engine system are reduced. The technical effect of maintaining the electric supercharger bypass valve closed even during conditions when the supercharger compressor is not activated and air flow through the supercharger compressor is not requested is that communication and mechanical delays incurred during the transition of the bypass valve from the open to the closed state are reduced. In addition, air flowing through the electric supercharger compressor with the bypass valve closed can assist in the acceleration of the compressor wheel when the supercharger compressor is reactivated. Further, the reduction in the duty cycle of events that use high current to slam the valve closed may improve the durability and lift of the valve. By selectively closing the valve when boost assistance is not required based on the effect of the valve closure on fuel economy is that overall boosted engine performance is improved. In addition, the control complexity required for the activation of the bypass valve and the coordination of the bypass valve with adjustments to an exhaust waste-gate is reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
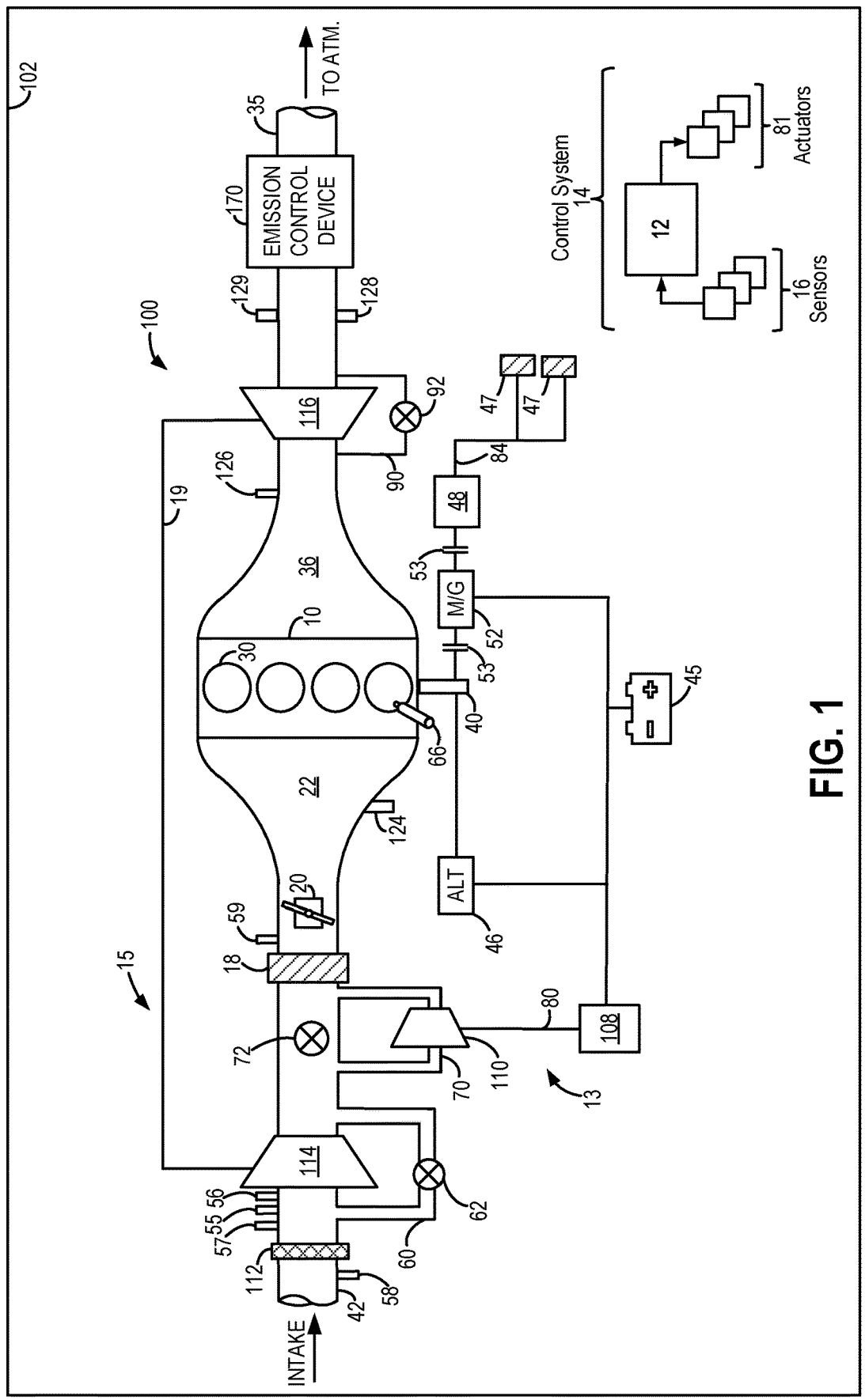
FIG. 1 shows an example embodiment of a compound boosted engine system having multiple staged intake compression devices and a bypass valve.
Figure 2:
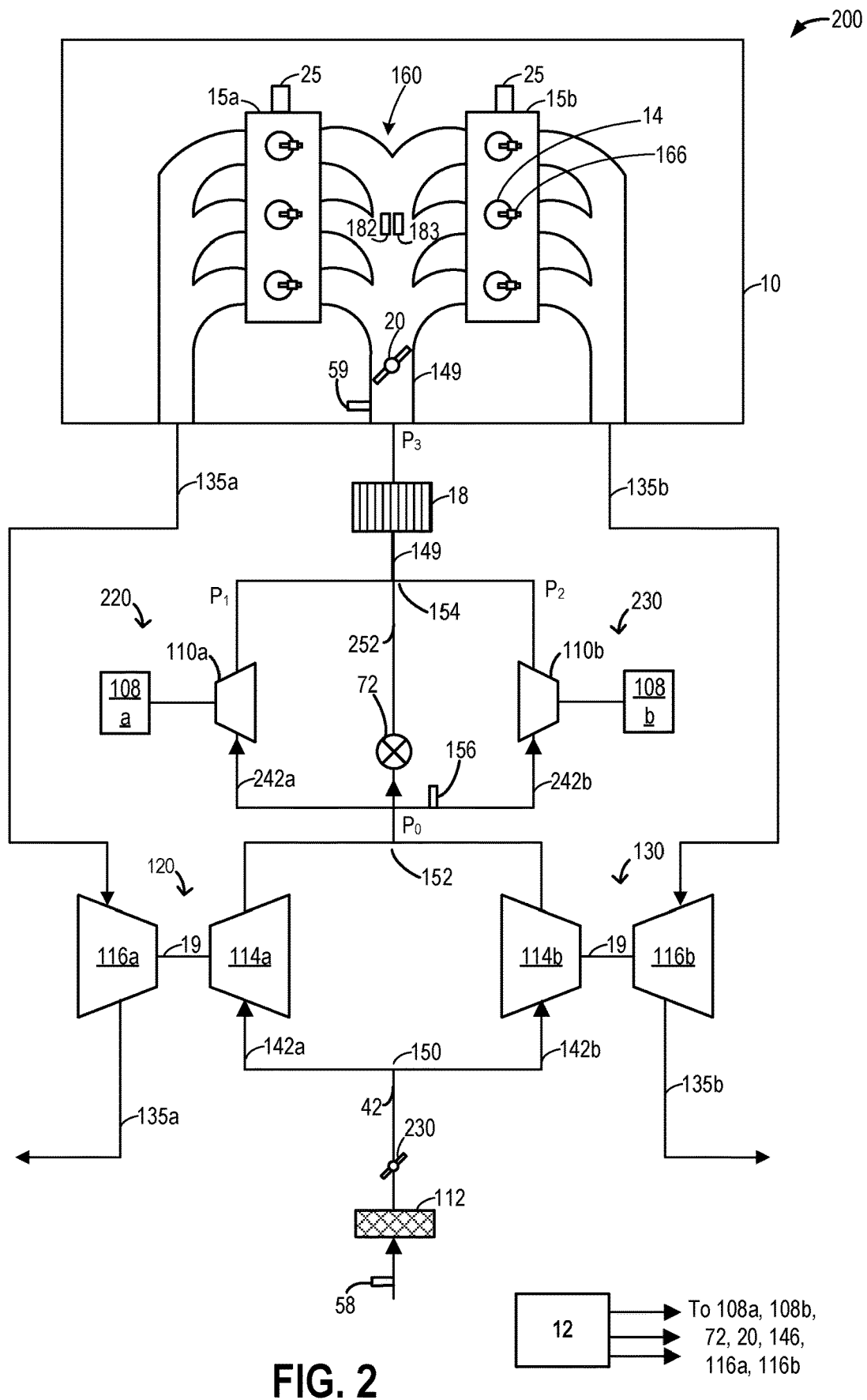
FIG. 2 depicts another example embodiment of a compound boosted engine system having multiple staged intake compression devices and a bypass valve.

The following description relates to systems and methods for boost control in an engine system having staged boosting devices, wherein at least one of the boosting devices is configured with electric assist. Non-limiting examples of such a boosted engine system are shown in FIGS. 1-2, wherein a turbocharger is staged upstream of an electric supercharger. An engine controller may be configured to perform a control routine, such as the example routine of FIG. 3, to provide boost control in the compound boosting system by allocating distinct pressure ratio commands to each compression device. In addition, the engine controller may further improve transient boost response by holding a bypass valve directing air flow through an electrically actuated compressor closed, in standby, prior to activation of the electric compressor (FIG. 4). An engine controller may be configured to refer to a map, such as the example map of FIG. 5, to identify engine operating regions where the bypass valve can be held closed while the electric compressor is deactivated, without compromising fuel efficiency. A prophetic example of coordinating bypass valve actuation with electric compressor operation in a staged boosted engine system is shown at FIG. 6.

FIG. 1 schematically shows aspects of an example engine system 100, including an engine 10 coupled in a vehicle 102. In some examples, vehicle 102 may be a hybrid vehicle with multiple sources of torque available to one or more vehicle wheels 47. In other examples, vehicle 102 is a conventional vehicle with only an engine. In the example shown, a powertrain of vehicle 102 includes engine 10 and an electric machine 52. Electric machine 52 may be a motor or a motor/generator. Engine 10 and electric machine 52 are connected to vehicle wheels 47 via a transmission 48 when one or more clutches 53 are engaged. In the depicted example, a (first) clutch 53 is provided between engine 10 and electric machine 52, and a (second) clutch 53 is provided between electric machine 52 and transmission 48. A controller 12 may send a signal to an actuator of each clutch 53 to engage or disengage the clutch, thereby connecting or disconnecting engine 10 from electric machine 52 and the components connected thereto and/or connecting or disconnecting electric machine 52 from transmission 48 and the components connected thereto. For example, torque from engine 10 may be transferred to vehicle wheels 47 via a crankshaft 40, transmission 48, and a powertrain shaft 84 when clutches 53 are engaged. Transmission 48 may be a gearbox, a planetary gear system, or another type of transmission. Transmission 48 may be a fixed ratio transmission that includes a plurality of gear ratios to allow engine 10 to rotate at a different speed than wheels 47. By changing a torque transfer capacity of first clutch 53 (e.g., an amount of clutch slippage), an amount of engine torque relayed to the wheels via powertrain shaft 84 may be modulated.

The powertrain may be configured in various manners, including as a parallel, a series, or a series-parallel hybrid vehicle. In electric vehicle embodiments, a system battery 45 may be a traction battery that delivers electrical power to electric machine 52 to provide torque to vehicle wheels 47. In some embodiments, electric machine 52 may also be operated as a generator to provide electrical power to charge system battery 45, for example, during a braking operation. It will be appreciated that in other embodiments, including non-electric vehicle embodiments, system battery 45 may be a typical starting, lighting, ignition (SLI) battery coupled to an alternator 46.

Alternator 46 may be configured to charge system battery 45 using engine torque drawn from the crankshaft during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. A voltage regulator may be coupled to alternator 46 in order to regulate the power output of the alternator based upon system usage requirements, including auxiliary system demands.

In the depicted embodiment, engine 10 is a compound boosted engine configured with multiple, staged boosting devices. Specifically, engine 10 includes a first boosting device staged upstream of a second boosting device. Herein, the first boosting device is a primary boosting device and the second boosting device is an auxiliary boosting device, although other configurations may be possible. The depicted configuration results in a first compressor 114 (of the first boosting device) being positioned in an engine intake passage 42 upstream of a second compressor 110 (of the second boosting device). At least one of the boosting devices may be configured with electric assistance from an electric motor. In the present example, the second boosting device is an electric supercharger 13 configured to operate with electric assistance from an electric motor, while the first boosting device is a turbocharger 15. However, other combinations and configurations of boosting devices may be possible without departing from the scope of this disclosure. For example, in alternate embodiments, turbocharger 15 may be an electric turbocharger having an electric motor coupled to the compressor, turbine, or turbocharger shaft while the supercharger is configured as an electrical or mechanical supercharger. In still other examples, both the first and second boosting device may be electric superchargers or electric turbochargers.

Turbocharger 15 includes first compressor 114, which is driven by a turbine 116. First compressor 114 is shown as a turbocharger compressor mechanically coupled to turbine 116 via a shaft 19, the turbine 116 driven by expanding engine exhaust. In one embodiment, the turbocharger may be a twin scroll device. In another embodiment, the turbocharger may be a variable geometry turbocharger (VGT), wherein turbine geometry is actively varied as a function of engine operating conditions.

Fresh air is introduced along intake passage 42 into engine 10 via air box 112 and flows to first compressor 114. During selected conditions, as elaborated below, air compressed by turbocharger 15 may be recirculated from an outlet to an inlet of first compressor 114 through a compressor recirculation passage 60 by adjusting an opening of a compressor recirculation valve (CRV) 62. CRV 62 may be a continuously variable valve, and increasing the opening of the CRV 62 may include actuating (or energizing) a solenoid of the valve.

Electric supercharger 13 includes second compressor 110, which is driven by an electric motor 108. Specifically, a fan of second compressor 110 may be driven by power received from electric motor 108 along a supercharger compressor shaft 80. In some examples, second compressor 110 of supercharger 13 may additionally be driven by the engine crankshaft via a clutch and gear mechanism. Electric motor 108 may be powered by an on-board energy storage device, such as system battery 45. Electric motor 108 may be additionally or alternatively powered by alternator 46. An amount of electrical power delivered to electric motor 108 may be varied in order to adjust a duty cycle of the supercharger. In one example, the amount of electric power delivered to electric motor 108 may be increased to increase the speed of second compressor 110. As a result of the electrical assistance, supercharger 13 may be rapidly spun up, providing for a fast-acting or high frequency boost actuation.

Second compressor 110 is positioned in a bypass 70, parallel to and offset from intake passage 42. Air received along intake passage 42 enters first compressor 114 and then flows towards intake manifold 22. Air may be directed from intake passage 42, downstream of the first compressor 114, into bypass 20 and through second compressor 110 via adjustments to the position of an electric supercharger bypass valve (ESBV) 72. ESBV 72 is positioned along intake passage 42, upstream of an inlet of bypass 70. When ESBV 72 is commanded open, air may flow from first compressor 114 to intake manifold 22 without passing through bypass 70 and second compressor 110. In one example, ESBV 72 may be commanded open when the second compressor is not actuated, such as when the turbocharger has spooled up, so that intake air compressed by the turbocharger compressor 114 can be delivered to engine cylinders without flowing through the supercharger. When ESBV 72 is commanded closed, air may flow from first compressor 114 to the intake manifold 22 upon flowing through bypass 70 and second compressor 110. In one example, ESBV 72 may be commanded closed when the second compressor is actuated, such as when the turbocharger has not spooled up, and there is a transient increase in torque or boost demand. Consequently, intake air is compressed by the supercharger compressor 110 and then delivered to engine cylinders while flowing through the bypass 70. By spinning up the electric supercharger via the electric motor, a burst of boost pressure may be rapidly provided to the engine, improving transient boost response while the turbocharger spools up.

Electric motor 108 may be configured as a motor-generator. Thus, during conditions when electric assistance is required for boost build-up, the electric motor may provide positive torque to drive either the centrifugal compressor of the supercharger (or the turbocharger shaft) to improve the transient boost pressure delivery. However, the electric motor is also capable of energy recuperation by "braking" the motor shaft. Therein, negative torque may be applied to the compressor (or shaft), reducing the compressor speed and concurrently charging the system battery (such as battery 45) coupled to the motor.

One or both of CRV 62 and ESBV 72 may be continuously variable valves wherein a position of the valve is continuously variable from a fully closed position to a fully open position. Alternatively, CRV 62 may be a continuously variable valve while ESBV 72 is an on-off valve. In some embodiments, CRV 62 may be partially open during boosted engine operation to provide a surge margin. Herein, the partially open position may be a default valve position. Then, in response to an indication of surge, the opening of CRV 62 may be increased. For example, CRV 62 may be adjusted from the default, partially open position toward a fully open position, with a degree of opening based on the indication of surge (e.g., the compressor ratio, the compressor flow rate, a pressure differential across the compressor, etc.). In alternate examples, CRV 62 may be held closed during boosted engine operation (e.g., peak performance conditions) to decrease boost response time and increase peak performance.

Air compressed by the first or the second compressor is then directed to the intake manifold 22 via passage through each of a charge-air cooler (CAC) 18 (also referred to as an intercooler herein), and a throttle valve 20, in that order. CAC 18 may be an air-to-air or water-to-air heat exchanger, for example. Intake manifold pressure (e.g., a pressure of the air charge within the intake manifold) may be determined using a manifold absolute pressure (MAP) sensor 124.

As such, flow through the bypass 70 and the second compressor 110 results in a flow restriction relative to the undeterred flow through the intake passage 42. Consequently, ESBV 72 may be commanded open when the electric supercharger 13 is not activated to improve fuel economy. However, the inventors herein have recognized that the delay incurred in closing the ESBV when the electric supercharger 13 is activated may degrade boosted engine performance. For example, while the electric second compressor 110 is activated to spin via the motor, there may be a communication and mechanical delay (e.g., a delay totaling 230 ms) that is incurred when the ESBV travels from a fully open to a fully closed position. This causes a delay in the transient engine performance. As elaborated herein with reference to FIGS. 3-4, an engine controller may selectively close the ESBV even during conditions when the supercharger compressor is not activated. In particular, if at any given operating condition, the closed ESBV does not degrade the fuel economy (or engine efficiency) by more than a tolerable amount, the controller may held the ESBV closed (or partially closed). By commanding the ESBV closed in standby prior to electric compressor activation, when the electric compressor is subsequently activated, the delay in ESBV closure is not incurred, and a substantially immediate pressure ratio response can be provided. This results in an immediate boost and torque response which improves engine performance during transients.

Returning to FIG. 1, intake manifold 22 is coupled to a series of combustion chambers 30 through a series of intake valves (not shown). The combustion chambers are further coupled to an exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted for the desired combustion and emissions-control performance. For example, the cam timing may be adjusted via a variable cam timing system to move the intake and exhaust cams to a position that provides the optimal volumetric efficiency for the given operating conditions.

Combustion chambers 30 may be supplied one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. In the depicted example, fuel is provided to each combustion chamber 30 via direct injection by a fuel injector 66 (while only one fuel injector is shown in FIG. 1, each combustion chamber includes a fuel injector coupled thereto). Fuel may be delivered to fuel injector 66 by a fuel system (not shown) including a fuel tank, a fuel pump, and a fuel rail. In the combustion chambers, combustion may be initiated via spark ignition and/or compression ignition.

As shown in FIG. 1, exhaust from exhaust manifold 36 is directed to turbine 116 to drive the turbine. When reduced turbine torque is desired, a portion of exhaust may be directed instead through a wastegate 90, bypassing the turbine. A wastegate actuator 92 (e.g., wastegate valve) may be actuated open to relieve at least some exhaust pressure from upstream of turbine 116 to a location downstream of turbine 116 via wastegate 90. By reducing exhaust pressure upstream of turbine 116, turbine speed may be reduced. When increased boost pressure is demanded, first compressor 114 may be spooled up by spooling up turbine 116. Therein, more turbine torque is provided by directing a larger portion of exhaust to be directed through the turbine, and not through wastegate 90. Wastegate actuator 92 (e.g., wastegate valve) may be actuated closed to increase the exhaust pressure upstream of turbine 116. By increasing the exhaust pressure upstream of turbine 116, turbine speed may be increased.

The combined flow from turbine 116 and wastegate 90 flows through an emission control device 170. In general, emission control device 170 may include one or more exhaust after-treatment components configured to reduce an amount of one or more substances in the exhaust flow. For example, one exhaust after-treatment component may be configured to trap $NO_x$ from the exhaust flow when the exhaust flow is lean and to reduce the trapped $NO_x$ when the exhaust flow is rich. In other examples, an exhaust after-treatment component may be configured to disproportionate $NO_x$ or to selectively reduce $NO_x$ with the aid of a reducing agent. In still other examples, emission control device 170 includes a three-way catalyst configured to oxidize residual hydrocarbons and carbon monoxide while reducing $NO_x$ in the exhaust flow. Different exhaust after-treatment catalysts having any such functionality may be arranged in wash coats or elsewhere in emission control device 170, either separately or together. In some embodiments, the emission control device 170 may further include a regeneratable soot filter configured to trap and oxidize soot particles in the exhaust flow.

All or part of the treated exhaust from emission control device 170 may be released into the atmosphere via an exhaust conduit 35. Depending on operating conditions, however, some exhaust may be diverted instead to intake passage 42 via an exhaust gas recirculation (EGR) passage (not shown), including an EGR cooler and an EGR valve. EGR may be recirculated to the inlet of first compressor 110, the inlet of second compressor 114, or both.

One or more sensors may also be coupled to intake passage 42 upstream of first compressor 114 for determining a composition and condition of aircharge entering the compressor. These sensors may include, for example, a pressure sensor 58 for estimating a barometric pressure of air upstream of air box 112. Other sensors include a temperature sensor 55 for estimating a compressor inlet temperature, and a pressure sensor 56 for estimating a compressor inlet pressure. Still other sensors may include, for example, air-fuel ratio sensors, humidity sensors, etc. Likewise, one or more sensors may also be coupled to intake passage 42 downstream of the first compressor 114 and upstream of the second compressor 110 for determining a composition and condition of aircharge entering the second compressor. In other examples, one or more of the first or second compressor inlet conditions (such as humidity, temperature, etc.) may be inferred based on engine operating conditions. The sensors may estimate a condition of the intake air received at the second compressor inlet from the intake passage. In addition, a throttle inlet pressure (TIP) sensor 59 may be coupled downstream of CAC 18 and upstream of throttle valve 20 for estimating a boost pressure delivered to the engine.

During an operator tip-in event, when going from engine operation without boost to engine operation with boost responsive to an increase in operator torque demand, turbo lag can occur. This is due to delays in turbine 116 spin-up due to the turbocharger being a slower-acting compression device, and momentary reduction in flow through first compressor 114 when throttle valve 20 opens at the tip-in. The same may also occur when the engine is operating boosted and there is a transient increase in boost demand due to an increase in accelerator pedal application by the vehicle operator. To reduce this turbo lag, during those selected conditions, both supercharger 13 and turbocharger 15 may be enabled. In particular, the faster-acting, electrically actuated compression device, the electric supercharger 13, may be used to improve the transient boost response. Specifically, responsive to the tip-in, waste-gate actuator 92 may be closed (e.g., fully closed) to increase exhaust flow through turbine 116. While turbine 116 spins-up, boost pressure can be transiently provided by second compressor 110. Enabling supercharger 13 may include drawing energy from system battery 45 to spin electric motor 108 and thereby accelerate second compressor 110. In addition, ESBV 72 may be closed (e.g., fully closed) so as to enable a larger portion of intake air to flow through bypass 70 and be compressed by second compressor 110. In addition, CRV 62 may be closed (e.g., fully closed) so as to increase flow through first compressor 114. When the turbine has sufficiently spun up and the turbocharger is capable of providing the requested amount of boost, second compressor 110 may be decelerated by disabling electric motor 108 (e.g., by discontinuing the supply of power to electric motor 108 from battery 45). In addition, ESBV 72 may be opened so as to enable a larger portion of air to bypass second compressor 110.

During an operator tip-out event, when going from engine operation with boost to engine operation without boost (or reduced boost), compressor surge may occur. This is due to a decreased flow through the first compressor 114 when throttle valve 20 closes at the tip-out. The reduced forward flow through the first compressor can cause surge and degrade turbocharger performance. In addition, surge can lead to noise, vibration, and harshness (NVH) issues such as undesirable noise from the engine intake system. To enable the torque demand to be rapidly reduced responsive to the tip-out without incurring compressor surge during a default mode of vehicle operation, at least a portion of the aircharge compressed by first compressor 114 may be recirculated to the compressor inlet. This allows excess boost pressure to be substantially immediately relieved. In particular, CRV 62 may be opened to recirculate (warm) compressed air from the outlet of first compressor 114, upstream of CAC 18, to the inlet of first compressor 114. In some embodiments, the compressor recirculation system may additionally or alternatively include a recirculation passage for recirculating cooled compressed air from downstream of CAC 18 to the inlet of first compressor 114. In addition, wastegate actuator 92 may be moved to a more open (e.g., fully open) position so that more of the exhaust flow travels to the tailpipe while bypassing the turbine, thereby expediting turbine spin-down.

Controller 12 may be included in a control system 14. Controller 12 is shown receiving information from a plurality of sensors 16 (various examples of which are described herein) and sending control signals to a plurality of actuators 81 (various examples of which are described herein). As one example, sensors 16 may include an exhaust gas sensor 126 located upstream of turbine 116, MAP sensor 124, an exhaust temperature sensor 128, an exhaust pressure sensor 129, compressor inlet temperature sensor 55, compressor inlet pressure sensor 56, a mass air flow (MAF) sensor 57, pressure sensor 58, and TIP sensor 59. Other sensors, such as additional pressure, temperature, air/fuel ratio, and composition sensors, may be coupled to various locations in engine system 100. The actuators 81 may include, for example, throttle valve 20, CRV 62, ESBV 72, electric motor 108, waste-gate actuator 92, and fuel injector 66. Controller 12 may receive input data from the various sensors, process the input data, and employ the various actuators to adjust engine operation based on the received signals and instructions stored on a memory of the controller. The controller may employ the actuators in response to the processed input data based on instruction or code programmed therein corresponding to one or more routines, such as example control routines described herein with regard to FIGS. 3-4. As an example, responsive to measured pressures indicating a boost pressure deficiency when operating the turbocharger, the controller may actuate the electric motor driving the supercharger compressor and actuate the ESBV closed in order to provide additional boost via the supercharger compressor.

Another example embodiment of a compound boosted engine system is shown at FIG. 2. Components previously introduced may be similarly numbered. FIG. 2 depicts an example boosted engine system 200 having a twin turbocharged and twin supercharged configuration with twin turbochargers 120 and 130, and twin superchargers 122 and 132.

Engine system 200 can receive intake air via intake passage 42. Intake passage 42 may include an air filter 112 and an air intake system (AIS) throttle valve 230. AIS throttle 230 may be positioned in the engine intake upstream of the first and second compressors 114a, 114b, and upstream of a split point from where the first and second parallel intake passages 142a and 142b diverge.

Engine system 200 may be twin-turbocharged and twin-supercharged engine system with a branched air intake system. Therein intake passage 42 is branched downstream of AIS throttle valve 230, at a first branch point 150, into first and second parallel intake passages (or branches) 142a and 142b, each including a turbocharger compressor. Specifically, at least a portion of intake air is directed to compressor 114a of turbocharger 120 via first parallel intake passage 142a and at least another portion of the intake air is directed to compressor 114b of turbocharger 130 via second parallel intake passage 142b. Compressor 114a of turbocharger 120 is driven by the rotation of turbine 116a while compressor 114b of turbocharger 130 is driven by the rotation of turbine 116b.

The first portion of the total intake air that is compressed by compressor 114a may combine with the second portion of the total intake air that is compressed by compressor 114b at second branch point 152. Intake air from intake passages 142a and 142b are recombined, at a common intake passage 252, before reaching intake manifold 160. Flow of recombined air from compressors 114a and 114b is directed into common intake passage 252 when bypass valve 72 is open. Bypass valve 72 may be open during conditions when boosted air is not required or when the turbocharger compressors are able to meet the boost pressure demand. From common intake passage 252, the intake air may be provided to the engine. Common intake passage 252 merges with intake passage 149 upstream of a charge air cooler 18 for cooling boosted air received from the turbocharger compressors and downstream of merge point 154 (described below). Air intake throttle 20 may be positioned in the engine intake downstream of the charge air cooler 18. Intake manifold 160 may include an intake manifold pressure sensor 182 for estimating a manifold pressure (MAP) and/or an intake manifold temperature sensor 183 for estimating a manifold air temperature (MCT), each communicating with controller 12.

When bypass valve 72 is closed, air may be directed through bypass passages 242a, 242b, each including a supercharger compressor, instead of flowing through common intake passage 252. Bypass valve 72 may be closed during conditions when the superchargers 122, 132 are actuated and the turbocharger compressors are not able to meet the transient increase in boost pressure demand. In particular, as the turbocharger compressors spool up, the supercharger compressors are powered via their corresponding electric motors to provide compressed air to the engine intake manifold. Specifically, a portion of the air received at second branch point 152 is directed through bypass passage 242a and first supercharger compressor 110a while a remaining portion of the air received at second branch point 152 is directed through bypass passage 242b and second supercharger compressor 110b. Compressor 110a of supercharger 122 is driven by the rotation of electric motor 108a while compressor 110b of turbocharger 132 is driven by the rotation of electric motor 108b. The first portion of the total intake air that is compressed by compressor 110a may combine with the second portion of the total intake air that is compressed by compressor 110b at merge point 154. Intake air from bypass passages 242a and 242b are recombined, at a common intake passage 149, before reaching intake manifold 160.

Engine 10 may include a plurality of cylinders 14. In the depicted non-limiting example, engine 10 is shown with six cylinders arranged in a V-configuration. Specifically, the six cylinders are arranged on two banks (or groups of cylinders) 15a and 15b, with each bank including three cylinders. Each cylinder 14 may be configured with a fuel injector 166. In the depicted example, fuel injector 166 is a direct in-cylinder injector. However, in other examples, fuel injector 166 can be configured as a port fuel injector.

Intake air supplied to cylinders 14 via common intake passage 149 may be used for fuel combustion. Products of combustion may then be exhausted via bank-specific parallel exhaust passages 135a, 135b. In the depicted example, exhaust from the first group of cylinders 15a is directed to first parallel exhaust passage 135a including turbine 116a of turbocharger 120 while exhaust from the second group of cylinders 15b is directed to second parallel exhaust passage 135b including turbine 116b of turbocharger 130. Exhaust gas directed through parallel exhaust passages 135a, 135b drives corresponding exhaust turbines 116a, 116b, which in turn can provide mechanical work to corresponding compressors 114a, 114b via shaft 19 in order to provide compression to the intake air. Alternatively, some or all of the exhaust gas in parallel exhaust passages 135a, 135b can bypass the turbines via corresponding waste-gates (not shown here but described earlier with reference to FIG. 1).

One or more additional valves and sensors described earlier with reference to the engine system of FIG. 1 may be similarly included in the engine system of FIG. 2, such as a compressor recirculation valve, waste-gates valves, and various pressure and temperature sensors.

In some examples, exhaust turbines 124 and 134 may be configured as variable geometry turbines, wherein controller 12 may adjust the position of the turbine impeller blades (or vanes) to vary the level of energy that is obtained from the exhaust gas flow and imparted to their respective compressor. Alternatively, exhaust turbines 124 and 134 may be configured as variable nozzle turbines, wherein controller 12 may adjust the position of the turbine nozzle to vary the level of energy that is obtained from the exhaust gas flow, and imparted to their respective compressors. For example, the control system can be configured to independently vary the vane or nozzle position of the exhaust gas turbines 116a and 116b via respective actuators. In addition, each of the parallel exhaust passages may include an emission control device, as elaborated with reference to FIG. 1.

Figure 3:
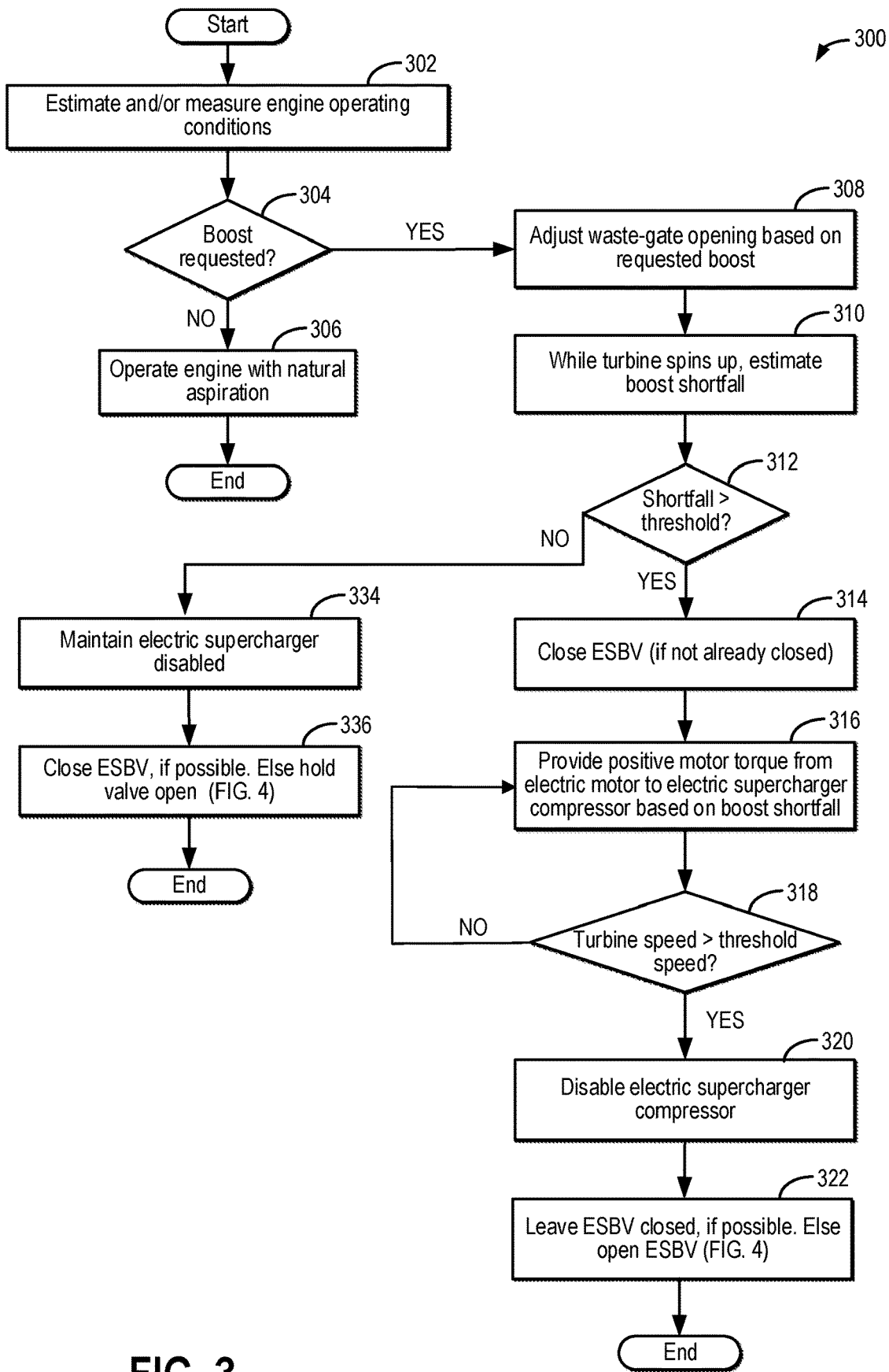
FIG. 3 depicts a high-level flow chart for operating the compound boosted engine system to meet torque demand during transients.
Figure 4:
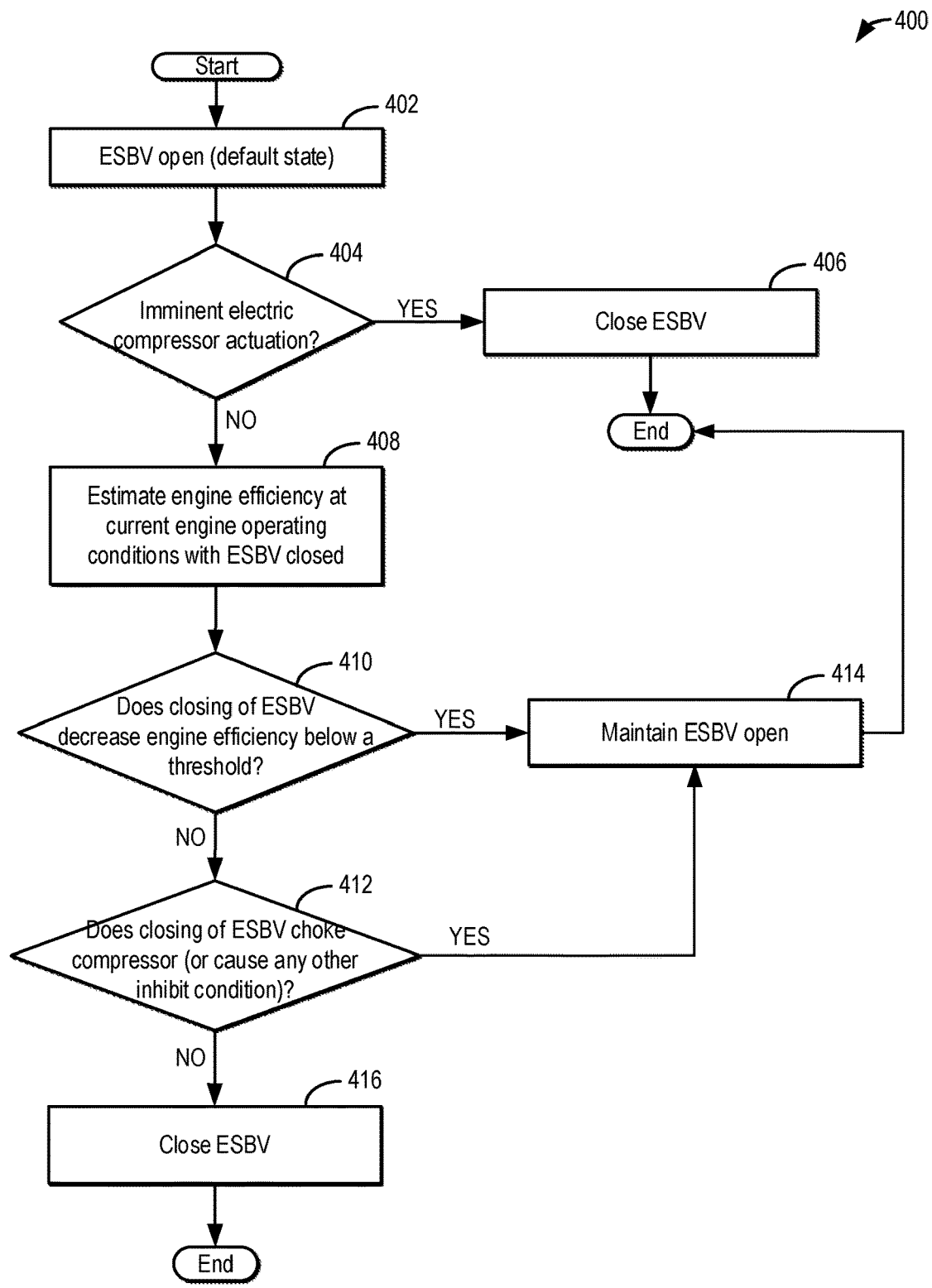
FIG. 4 depicts a high-level flow chart for actuating the bypass valve coupled to the compound boosted engine system.

As elaborated with reference to FIGS. 3-4, controller 12 may control the opening and closing of bypass valve 72 based on torque or boost pressure shortfall, and further based on a change in engine fuel efficiency upon closing the valve. The boost pressure shortfall may be determined by comparing pressure ratios across different parts of the engine system. For example, a first pressure ratio $P_0$ may be determined based on the pressure measured at second branch point 152 (downstream of the turbocharger compressors and upstream of the supercharger compressors). Pressure ratio $P_0$ may be estimated based on the supercharger compressor inlet pressure, estimated via pressure sensor 156, relative to barometric pressure, estimated via BP sensor 58. As another example, a second set of pressure ratios $P_1$ and $P_2$ may be determined based on the pressure measured at merge point 154 (across the supercharger compressors). Pressure ratios $P_1$ and $P_2$ may be estimated based on the supercharger compressor outlet pressure, inferred based on operating conditions, relative to supercharger compressor inlet pressure, estimated via pressure sensor 156. As another example, a third pressure ratio $P_3$ may be determined based on the pressure measured at throttle 20. Pressure ratio $P_3$ may be estimated based on the throttle inlet pressure, estimated via TIP sensor 59, relative to the inferred supercharger compressor outlet pressure.

During conditions when there is a shortfall, such as high load conditions, the bypass valve may be closed to divert intake air to the engine cylinders via the bypass passages, and upon flow through the supercharger compressors. At the same time, the supercharger compressors may be activated, by providing electrical power to their corresponding electric motors. The rotation of the supercharger compressors via the electric motors compresses the intake air flowing therethrough and raises the pressure ratio to compensate for the boost pressure ratio shortfall. At the same time, turbocharger waste-gates are closed to spool up the turbines. Once the turbines are sufficiently spooled up, and the pressure ratio across the turbochargers is raised, the bypass valve may be opened.

During selected low load conditions, the bypass valve may be closed to divert intake air to the engine cylinders via the bypass passages, and upon flow through deactivated supercharger compressors. The supercharger compressors may be deactivated by disabling electrical power to their corresponding electric motors. At this time, no electrical power is provided by the electric motors to the supercharger compressors, and additionally no electrical power is generated at the electric motors via the supercharger compressors. In particular, the supercharger compressors are freewheeling. Optionally, electrical settings may be adjusted to reduce the counter electromotive force (or back EMF) applied by an alternator coupled to the electric motor so as to further enable freewheeling of the supercharger compressors. The selected low load conditions may be selected based on a mapping of engine performance and fuel economy with the bypass valve closed versus the valve open, as elaborated with reference to FIG. 5.

In still further examples, the bypass valve of FIGS. 1-2 may be diagnosed based on a rotation speed of the deactivated supercharger compressor(s) following the closing of the bypass valve. For example, if the rotation speed is lower than a threshold (or if there is a lower than threshold change/rise in threshold speed) after commanding the bypass valve closed, then it may be indicated that the bypass valve is degraded. For example, it may be inferred that the bypass valve is stuck partially open or fully open when commanded to be closed.

In this way, the components of FIGS. 1-2 enable a vehicle system comprising: an engine; a branched intake passage system including a common upstream intake passage branching into first and second, parallel branches, and rejoining into a common downstream intake passage; a twin turbocharger including a first intake compressor in the first branch, driven by a first exhaust turbine, and a second intake compressor in the second branch, driven by a second exhaust turbine; a twin supercharger including a third intake compressor driven by a first electric motor, the third intake compressor housed in a first bypass passage bypassing the common downstream intake passage, and a fourth intake compressor driven by a second electric motor, the fourth intake compressor housed in a second bypass passage bypassing the common downstream intake passage, the first bypass and second bypass parallel to each other and to the common downstream passage; a bypass valve coupled in the common downstream passage, downstream of an inlet of each of the first and second bypass passages; and a controller. The controller may be configured with computer readable instructions stored on non-transitory memory for: while operating the engine with each of the first, second, third, and fourth intake compressors deactivated, selectively closing the bypass valve to direct all intake air to the engine via a combination of the first and second branches, and then via a combination of the first and second bypass passages, while bypassing the common downstream passage, the selectively closing based on engine fuel economy with the bypass valve closed relative to bypass valve open; and responsive to an increase in torque demand, maintaining the bypass valve closed while activating the third and fourth compressors. In one example, the selectively closing is further based on a choke limit of each of the third and fourth intake compressor. In some examples, the vehicle system further comprises a sensor for estimating a rotation speed of at least one of the third and fourth compressor, and the controller includes further instructions for indicating degradation of the bypass valve responsive to a lower than threshold change in rotation speed of the at least one of the third and fourth compressor following the selectively closing, the indicating degradation including indicating that the bypass valve is stuck open.

Turning now to FIG. 3, an example method 300 for operating a compound boosted engine system having staged boosting devices is shown. The compound boosted engine system may include at least two, serially arranged intake compression devices, at least one of which includes electric assist. One of the at least two compression devices may be a slower acting (lower frequency) compression device, such as a turbocharger configured as the primary boosting device, while another other of the two compression devices may be a faster acting (higher frequency) compression device, such as an electric supercharger configured as the auxiliary boosting device. Instructions for carrying out method 300 and the rest of the methods included herein may be executed by a controller (e.g., controller 12 of FIG. 1) based on instructions stored on a memory of the controller and in conjunction with signals received from sensors of the engine system, such as the sensors described above with reference to FIGS. 1-2. The controller may employ engine actuators of the engine system, such as an electric supercharger bypass valve (e.g., ESBV 72 of FIGS. 1-2), an electric motor (such as motor 108 of FIG. 1), and a turbocharger wastegate actuator (e.g., wastegate actuator 92 of FIG. 1), to adjust engine operation according to the methods described below.

At 302, method 300 includes estimating and/or measuring engine operating conditions. For example, operating conditions assessed may include engine speed, pedal position, operator torque demand, manifold absolute pressure, manifold air flow, manifold air temperature, ambient conditions (such as ambient temperature, barometric pressure, and humidity), engine coolant temperature, etc. For example, barometric pressure may be measured by a pressure sensor, such as pressure sensor 58 of FIGS. 1-2.

At 304, method 300 includes determining if boost is requested. In one example, boost may be requested at mid-high engine loads. In another example, boost may be requested in response to an operator pedal tip-in or an increase in driver torque demand. If boost is not requested, such as when the engine load is low or the driver torque demand is low, method 300 proceeds to 306 and includes operating the engine with natural aspiration (e.g., manifold vacuum). Operating the engine with natural aspiration may include not activating the staged boosting devices. For example, an electric motor for driving the electric supercharger (e.g., electric motor 108) may not be powered, and the turbocharger waste-gate actuator may be commanded fully open in order to direct a portion of exhaust through the waste-gate while bypassing a turbine of the turbocharger (e.g., turbine 116 of FIG. 1). Following 306, method 300 ends.

If boost is requested at 304, such as responsive to a tip-in event, method 300 proceeds to 308 and includes adjusting a boost pressure actuator of the slower acting primary compression device, such as a waste-gate valve coupled to the exhaust turbine of the turbocharger, based on the requested boost. In one example, the controller may generate an overall pressure ratio command for the slower, primary compression device based on the operator torque/boost demand. Herein the overall pressure ratio is a steady-state desired pressure ratio that is commanded to, and achieved by, the primary compression device gradually. The overall pressure ratio commanded may be determined as a ratio of the desired throttle inlet pressure (or a desired pressure at the outlet of the compound boosting system) relative to an inlet pressure of the compound boosting system (or a barometric pressure). In one example, wherein the primary compression device is a turbocharger, the controller may generate a command for the waste-gate valve coupled to the waste-gate passage across the exhaust turbine based on the generated overall pressure ratio command. The command for the waste-gate may be indicative of a degree of waste-gate valve opening that is sent to a waste-gate actuator. In one example, as the overall pressure ratio command increases, the degree of opening of the waste-gate commanded may be decreased. For example, at higher than threshold pressure ratio commands, the waste-gate may be fully closed.

In one example, the controller may input the overall pressure ratio command and MAF (as determined from an intake MAF sensor) into a look-up table (or model or algorithm) which outputs a position of the turbocharger waste-gate actuator, the position of the turbocharger waste-gate actuator corresponding to a turbine speed and a corresponding turbocharger compressor speed. In another example, the controller may reference a compressor map to determine a desired turbocharger compressor speed for the commanded overall boost pressure ratio and the given airflow conditions and may further relate the resulting turbocharger compressor speed to a corresponding position of the turbocharger waste-gate actuator. Further, the actual turbocharger pressure ratio (the ratio between the pressure at the outlet and the inlet of the turbocharger compressor) may be used as feed-back for waste-gate control. For example, as the actual turbocharger pressure ratio increases, the turbocharger waste-gate actuator may be adjusted to a more open position. Additionally or alternatively, if the turbocharger is within a threshold range of surge, the openings of one or both of the CRV and the waste-gate actuator may be increased.

It will be appreciated that in further examples, the commanded overall pressure ratio may be adjusted (e.g., limited) to account for any mechanical constraints of the boosted engine system, such as a temperature, pressure, or speed constraint of the primary compression device, above which (temperature, pressure, or speed) the performance of the primary compression device may be adversely affected, such as due to hardware issues. In one example, if the commanded overall pressure ratio based only on the operator torque demand is predicted to result in a compressor inlet or outlet temperature (of the primary compression device) that is higher than a threshold temperature where the hardware of the primary compression device is degraded, the controller may reduce the commanded overall pressure ratio with a factor based on the difference between the predicted temperature and the threshold temperature.

Due to the waste-gate closure, more exhaust is flowed through the turbine causing the turbine to start spooling up, which in turn causes the compressor of the turbocharger to also spin up. However, due to the mechanical inertia of the turbine, there may be a delay in getting the compressor and turbine to a speed where the turbocharger can support the boost demand. In particular, due to the slower response time of the primary compression device, herein the turbocharger, there may be a temporary boost pressure deficit. For example, the deficit may be due to steady-state boost pressure delivery requiring the turbine to be spun up before it can drive the turbocharger compressor.

Accordingly, at 310, while the turbine spins up, the method includes estimating the boost pressure deficit or shortfall. The controller may also estimate a corresponding airflow shortfall required to meet the boost demand. In one example, the shortfall may be determined as a difference between the demanded boost pressure (based on the torque demand) and the boost pressure output by the turbocharger compressor. As another example, the shortfall may be determined as a pressure ratio shortfall, calculated as a ratio or difference of the actual pressure ratio across the primary compression device relative to the desired or commanded pressure ratio. The actual pressure ratio may be determined as the compressor inlet pressure of the primary compression device relative to the actual throttle inlet pressure. This boost pressure deficiency reflects the boost or airflow shortfall at the primary compression device and can used to allocate an output command (e.g., pressure ratio command) to the auxiliary compression device.

At 312, the method compares the estimated shortfall to a threshold. If the shortfall is less than the threshold, the controller may infer than the turbocharger will be able to meet the boost pressure demand. Accordingly at 334, the method includes maintaining the auxiliary compression device, herein the electric supercharger compressor, disabled. The auxiliary device being disabled includes no electrical power being provided to the electric motor coupled to the supercharger compressor. In addition, no electrical power may be generated via the electric motor coupled to the supercharger compressor. At 336, the bypass valve directing air flow from the outlet of the turbocharger compressor into the electric supercharger compressor is closed, if possible. This includes directing all intake air to engine cylinders via the electric supercharger compressor. When the ESBV is closed, no air is directed through the intake passage, downstream of the turbocharger compressor. At this time, when the ESBV is closed and the supercharger compressor is deactivated, the compressor "fan" may be freewheeling. In some examples, the controller may further adjust electrical circuit settings so as to reduce the back EMF experienced at an alternator coupled to the electric motor to enable the supercharger compressor to freewheel more easily. By freewheeling the supercharger compressor by directing all intake air to flow through the supercharger compressor, the supercharger is placed in a standby mode with the pressure ratio raised in anticipation of an increase in torque demand. Else, if ESBV closure is not feasible, the ESBV is maintained open, if already open. As elaborated with reference to FIG. 4, the controller may opportunistically close the ESBV when possible so that the pressure ratio across the supercharger can be rapidly further increased when there is a transient increase in boost demand and a higher than threshold shortfall. In particular, by holding the ESBV closed whenever it does not affect engine efficiency, mechanical and communication delays incurred in closing the ESBV can be reduced, improving transient response.

Returning to 312, if the shortfall is higher than the threshold, it may be inferred that there may be turbo lag and that electric assistance from the auxiliary compression device is required to meet the transient increase in torque demand. Since the primary and auxiliary compression devices are arranged in series, the overall pressure ratio across the compound boosted system may be calculated as the product of the pressure ratios across each compressor in series. The pressure ratio represents the capability of the boosting device (e.g. electric supercharger, turbocharger or the compound boosting system). However, the throttle inlet pressure cannot separate the boost contribution from each device. Thus, by coordinating the pressure ratios commanded to each boosting device together with a steady-state desired pressure ratio, transient boost response can be improved.

At 314, before commanding the electric supercharger to operate, the ESBV is closed, if not already closed. Then, at 316, the method includes commanding electric assistance to the auxiliary compression device. In particular, the controller may command positive motor torque from the electric motor to the auxiliary compression device, such as the electric supercharger, as a function of the shortfall. In one example, commanding the positive motor torque includes estimating a compressor speed of the electric compressor that will provide the desired compressor outlet pressure at the electric supercharger, such as via a look-up table, map, or algorithm, and then estimating a motor speed of the electric motor (or a degree of electric assistance) that will provide the estimated compressor speed. The controller may then adjust a duty cycle commanded to the electric motor to operate the motor at the required motor speed.

In one example, the controller may generate a pressure ratio command for the faster auxiliary, compression device based on the airflow shortfall, the pressure ratio deficit, or the boost pressure shortfall. For example, the controller may estimate an inlet pressure of the electric supercharger (e.g., based on a measured barometric pressure) and use a look-up table, model, or algorithm to calculate a desired outlet pressure of the electric supercharger that meets the airflow shortfall. The pressure ratio command for the electric supercharger may then be determined as ratio of the actual inlet pressure relative to the desired outlet pressure.

Next, at 318, it may be determined if the turbine speed is higher than a threshold speed. For example, it may be determined if the turbine has spooled up to a speed above which the turbocharger is able to support the boost demand. In an alternate example, the actual boost pressure may be compared to the target throttle inlet pressure to determine if the actual boost pressure is within a threshold of the target throttle inlet pressure (TIP). For example, it may be determined if the outlet pressure of the turbocharger is within a threshold of the desired TIP, such as when a difference between the outlet pressure and the desired TIP is smaller than a threshold. In still another example, a ratio of the outlet pressure of the turbocharger may be compared to the target throttle inlet pressure.

If the turbine speed is lower than the threshold speed, or if the difference (or ratio) is not within the threshold, then the method returns to 316 to continue providing positive motor torque from the electric motor to the electric supercharger compressor to improve the transient boost response. The controller may continually adjust the positive torque output to the electric supercharger compressor as the boost shortfall decreases while the turbine speed increases. For example, as the turbine spins up and the boosting capability of the turbocharger increases, the pressure ratio across the turbocharger may start to approach the commanded pressure ratio, the shortfall may start to drop, and accordingly the pressure ratio and electric assistance commanded at the electric supercharger may be decreased.

If the turbine speed is higher than the threshold, or if the pressure ratio is within the threshold, then at 320, electric assistance is disabled. Specifically, the electric supercharger is disabled by discontinuing delivery of motor torque from the electric motor to the compressor. As a result, the electric supercharger compressor may start to spin to rest. At 322, the bypass valve directing air flow from the outlet of the turbocharger compressor into the electric supercharger compressor is maintained closed, if possible. Else, the ESBV is actuated open. As elaborated with reference to FIG. 4, the controller may opportunistically close the ESBV even when the supercharger compressor is disabled, when possible, so that the pressure ratio across the supercharger can be rapidly increased when there is a subsequent transient increase in boost demand and a higher than threshold shortfall.

In some embodiments, the bypass valve may also be diagnosed based on supercharger compressor rotation speed when the bypass valve is commanded closed. For example, the controller may monitor a speed of the electrically-driven supercharger compressor while intake air is directed to the engine via the deactivated/disabled compressor and with the ESBV commanded closed. The controller may then indicate that the bypass valve is degraded (e.g., the bypass valve is stuck partially open or fully open) responsive to the monitored speed being lower than a threshold speed after commanding the bypass valve closed. Alternatively, the controller may indicate that the bypass valve is stuck open responsive to a change in the monitored speed after commanding the bypass valve closed being lower than a threshold.

Turning now to FIG. 4, an example method 400 for adjusting the state of a bypass valve of a compound boosting system (such as ESBV 72 of FIG. 1) is shown. The method enables the valve to be closed in stand-by while a supercharger compressor is disabled, causing at least a portion of air to be directed to the intake manifold via the disabled compressor. Consequently, a pressure ratio across the supercharger compressor is raised even before the compressor is enabled, and the pressure ratio can be further raised, rapidly, when the compressor is enabled to meet a transient increase in torque demand. In one example, the method of FIG. 4 may be performed as part of the method of FIG. 3, such as at 322 and/or 336.

At 402, the ESBV is maintained in its default open state. For example, the ESBV is held fully open. At 404, the method includes determining if electric compressor actuation is imminent. As used herein, the electric compressor refers to the compressor of the auxiliary compression device, herein the electric supercharger compressor. In one example, electric compressor actuation may be imminent if there is a higher than threshold increase in torque demand (such as a large boosted to boosted tip-in, or a non-boosted to boosted tip-in). In another example, electric compressor actuation may be imminent if there is a boost pressure shortfall after actuating the turbocharger compressor (or other primary compression device).

If the electric compressor actuation is imminent, then at 406, the method includes actuating the ESBV to a closed position, such as by transitioning the valve from the fully open position to a fully closed position. The controller may send a signal to an actuator of the ESBV valve to move the valve to the fully closed position.

If the electric compressor actuation is not imminent, then at 410, the method includes determining if closing of the ESBV can decrease the engine efficiency below a threshold. For example, the controller may estimate the current engine operating conditions including engine speed and load, and then refer to a map, such as map 500 of FIG. 5, to determine if the engine efficiency drops below a threshold upon closing the valve.

Figure 5:
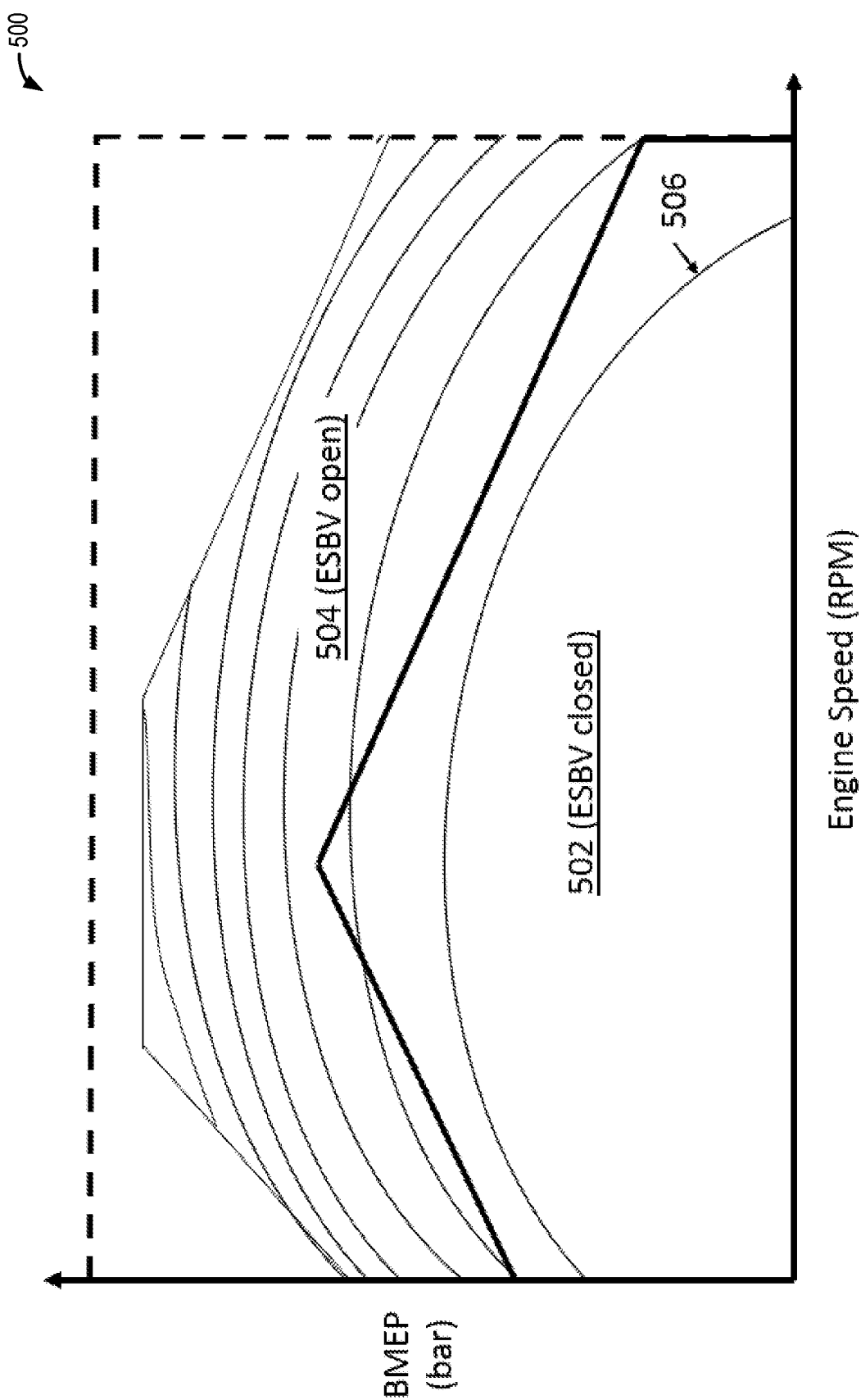
FIG. 5 depicts an example engine operation map that may be used to identify regions of engine operation where engine fuel economy is not impacted by the closing of the bypass valve.
Figure 6:
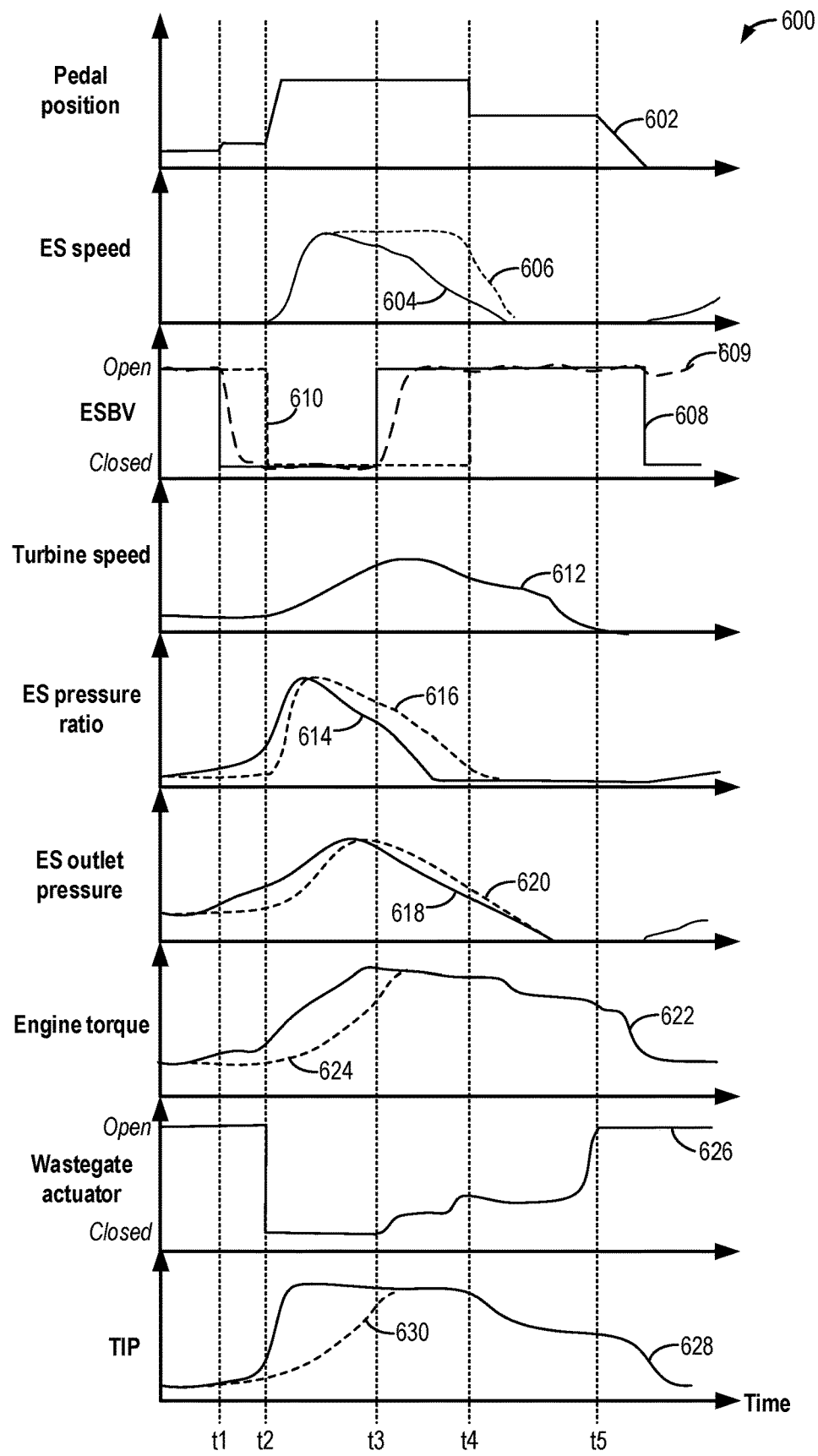
FIG. 6 depicts a prophetic example of turbocharger and electric supercharger pressure ratio coordination during vehicle operation.

Turning briefly to FIG. 5, map 500 depicts a map of engine efficiency degradation when the ESBV is closed versus when it is open; island 506 is an area where the ESBV has no impact. Based on the map, the controller may identify a first region of engine operation 502 wherein the engine can operate with the ESBV closed and the electric compressor not activated and without losing efficiency. The controller may further identify a second region of engine operation 504 wherein the engine cannot operate with the ESBV closed and the electric compressor activated, without losing efficiency. Therefore in region 504, the ESBV is maintained open until the electric compressor is activated.

Returning to FIG. 4, if it is determined that closing of the ESBV will cause a decrease in engine efficiency (such as when the engine is operating within region 504 of map 500), at 414, the method includes maintaining the ESBV open. Else, the method moves to 412 to determine if closing of the ESBV causes any inhibit or limiting conditions that can affect electric compressor operation. For example, it may be determined if closing the ESBV can choke the electric compressor (wherein further forward flow of air through the compressor is inhibited). If a choke condition is predicted, then also the method moves to 414 to maintain the ESBV open.

If closing of the ESBV does not decrease the engine efficiency or cause the electric compressor to be choked (or otherwise limited), then at 416, the method includes actuating the ESBV open (for example, to a fully open position). For example, the controller may send a signal to an actuator of the ESBV to move the valve to the fully closed position.

In this way, by closing the ESBV in standby while an electric compressor is disabled, and before electric compressor activation is commanded, the communication and mechanical delay incurred in the closing of the ESBV for electric compressor activation is reduced. As a result, engine transient response from the electric compressor is improved. The air flowing through the electrical compressor with the bypass valve closed may assist in the acceleration of the compressor wheel when the electric compressor is subsequently activated.

In this way, during selected low load conditions when an electrically-driven compressor coupled to a turbine-driven compressor is not activated, a controller may command a bypass valve closed to direct intake air to an engine via the deactivated compressor. In one example, the electrically-driven compressor being deactivated includes no electrical power being provided to an electric motor coupled to the electrically-driven compressor, and no electrical power being generated by the electric motor. Further, the controller may adjust a counter electromotive force applied by an alternator coupled to the electric motor to enable freewheeling of the electrically-driven compressor. The bypass valve may be closed in anticipation of a tip-in from the selected low load conditions to an engine operating condition where boost assistance from the electrically-driven compressor is required. In one example, the selected low load conditions include low load conditions where engine fuel economy with the bypass valve closed and the electrically-driven compressor deactivated is higher than the engine fuel economy with the bypass valve open and the electrically-driven compressor deactivated. For example, the selected low load conditions may be mapped and may include engine speed increasing from rest to a first threshold speed and decreasing from the first threshold speed to a second threshold speed, and concurrently, engine load increasing from a first load to a first threshold load, and then decreasing from the first threshold load to a second load, the second load lower than the first load. Further, a rate of the increasing engine speed from rest to a first threshold speed may be higher than the rate of decreasing engine speed from the first threshold speed to the second threshold speed, and a rate of the increasing engine load from the first load to the first threshold load may be higher than the rate of the decreasing engine load from the first threshold load to the second load. In one example, the turbine-driven compressor is coupled in an intake passage, and the electrically-driven compressor is coupled in a bypass passage, the bypass passage coupled to the intake passage upstream of the bypass valve. Herein, directing intake air to the engine via the deactivated compressor includes diverting all the intake air from the intake passage into the bypass passage, and flowing all the intake air from the bypass passage to the engine upon passage through the deactivated electrically-driven compressor. The turbine-driven compressor may be staged upstream of the electrically-driven compressor, and the selected low load conditions may further include the electrically-driven compressor not being choke limited. Further, the controller may monitor a speed of the electrically-driven compressor during the directing of intake air to the engine via the deactivated compressor; and indicate that the bypass valve is stuck at least partially open responsive to the monitored speed being lower than a threshold speed after commanding the bypass valve closed.

Turning now to FIG. 6, a prophetic example graph 600 of coordinated turbocharger and electric supercharger control during vehicle operation, such as according to the method of FIG. 3 (and FIG. 4) is depicted. Accelerator pedal position is shown in plot 602, and electric compressor speed is shown at plot 604. A commanded electric supercharger bypass valve (ESBV) position is shown at plot 608 (solid line) while an actual degree of opening of the ESBV is shown in plot 609 (long dashed line). A turbocharger turbine speed is shown at plot 612, a pressure ratio across the electric supercharger compressor (ES) is shown at plot 614, an ES outlet pressure is shown at plot 618, engine torque is shown at plot 622, and a degree of opening of a turbocharger waste-gate is shown at plot 626. Throttle inlet pressure (TIP) is shown at plot 628. For all of the above, the X-axis represents time, with time increasing along the X-axis from left to right. The Y-axis represents the labeled parameter, with values increasing from bottom to top. In the present example, the electric supercharger compressor is located downstream of the turbocharger compressor, such as in the engine system of FIG. 1.

Prior to time t1, the engine is operated without boost due to a lower driver demand (plot 602) requiring a lower TIP (plot 626). Accordingly, the waste-gate is fully open (plot 626) and the turbine is not spinning (plot 612). Also the ES is not being spun by its electric motor (plot 604). Engine torque (plot 622) is provided based on the torque demand via engine operation with natural aspiration. Since boost is not required, the ESBV is also open (plot 609) so that air may flow to the engine intake while bypassing the ES compressor. Also at this time, based on operating conditions, it is determined that closing of the ESBV (while the ES is not spinning) may cause engine efficiency to drop by more than a threshold, and therefore the ESBV is commanded open (plot 608) and is not closed opportunistically.

At t1, the operator torque demand increases, while still remaining below a level requiring boost. Therefore, the waste-gate is maintained fully open. Also, both the turbine and the ES are not spinning. However, due to a change in the operating conditions, it is determined that closing the ESBV (while the ES is not spinning) will not cause engine efficiency to drop by more than the threshold. Therefore at t1, the ESBV is commanded closed (plot 608). Due to a mechanical and communication delay, the ESBV actually fully closes (plot 609) shortly after the command is received.

As a result of the closing of the ESBV, air is directed to the engine cylinders from downstream of the turbocharger compressor (which is not spinning via the turbine) via a bypass including the ES compressor (which is also not spinning via its electric motor). The flow of air through the ES causes the ES compressor to start spinning at a very slow speed. The combination of the flow through the ES and the low spinning of the ES compressor causes the pressure ratio across the ES to start to rise, even though there is no boost demand and even though the ES is not being spun by it electric motor. By closing the ESBV and raising the compressor ratio across the ES gradually, the ES is held in a stand-by mode that allows the transient response of the ES and thereby the boosted engine to be improved when there is a subsequent increase in torque demand.

At t2, there is an increase in operator torque demand due to a larger tip-in (such as a tip-in from non-boosted to boosted engine operation). The increased torque demand requires boosted engine operation. Therefore at t2, the waste-gate is fully closed so as to start spinning the turbine to drive the turbocharger compressor. Due to turbo lag, while the turbine spools up, the ES compressor is spun to up to meet the transient increase in torque demand that cannot be met by the turbocharger. In particular, a duty cycle is commanded to the electric motor coupled to the ES causing the ES speed to rise. Since the ESBV is already open and flowing air through the ES compressor, the spinning of the electric motor allows for a rapid rise in the ES outlet pressure, and the ES pressure ratio. This translates to a rise in the TIP and thereby engine torque. In this way, due to the ES adjustments, the engine torque output rapidly increases to meet the torque demand while the turbine spools up.

If the ESBV were commanded closed at t2 concurrent with ES spinning via the motor (as shown at small dashed line 610), due to the mechanical and communication delay incurred in actual ESBV closing, the actual flow through the ES would have occurred with a delay. In particular, the ES outlet pressure would rise later (see dashed plot 620), and the ES pressure ratio would start to rise later and slower than desired (see dashed plot 616). Consequently, the TIP response would be slower (see dashed plot 630) and engine torque rise would be slower (see dashed plot 624). As a result, the transient boost response of the engine would be degraded. For example, the engine may appear sluggish when the tip-in occurs.

At t3, the turbine has spooled up sufficiently and the turbocharger is able to support the torque demand. Therefore at t3, the ESBV is commanded closed. In addition, the electric motor coupled to the ES is disabled, and the ES spins down towards rest. This causes the ES outlet pressure and ES pressure ratio to also start to gradually drop. After t3, air is compressed via the turbocharger compressor and delivered to engine cylinders while bypassing the ES.

As such, if the ESBV were not operated in the stand-by mode wherein it was closed before the ES was commanded to spin, the lower ES compressor ratio may have required the ESBV to stay closed longer, and the ES to continue spinning, for example till shortly before t4, to ensure that sufficient TIP and engine torque is produced to meet the torque demand. As such, the prolonged operation of the ES may result in a net fuel penalty.

At t4, there is a small tip-out, and a resultant drop in torque demand. However, boosted operation is still required. The decreased torque demand is met by increasing the opening of the waste-gate in proportion to the drop in torque demand. At t5, there is a larger tip-out, to un-operation. The decreased torque demand is met by fully opening the waste-gate. At t4 and t5, the ESBV remains open due to the operating conditions being such that the closing of the ESBV would cause a drop in engine efficiency. Also at t4 and t5, the ES remains disabled.

Shortly after t5, operating conditions change and closing of the ESBV does not cause a drop in engine efficiency. While the ES is disabled, the ESBV is closed to move the ES to a stand-by mode from where ES response can be rapidly increased when there is a subsequent increase in torque demand.

In this way, prior to an anticipated increase in torque demand, an engine controller may selectively raise a pressure ratio across an electric supercharger by diverting intake air through a deactivated compressor of the electric supercharger from downstream of a deactivated turbocharger compressor. The diverting includes closing a bypass valve coupled in an intake passage downstream of the turbocharger compressor to divert all of the intake air to engine cylinders via a bypass housing the electric supercharger. The selectively raising includes closing the bypass valve in an engine speed-load region where fuel economy with the bypass valve closed is higher than a threshold, the engine speed-load region mapped by overlaying engine efficiency with the ESBV closed versus open. Then, responsive to an actual increase in torque demand, while maintaining the bypass valve closed, the controller may activate the supercharger compressor to further raise the pressure ratio based on the increased torque demand. The controller may also indicate that the bypass valve is stuck open responsive to supercharger compressor speed being lower than a threshold during the diverting intake air. The diverting of the intake air through the deactivated compressor may include freewheeling the deactivated compressor of the electric supercharger without providing electrical power from an electric motor to the deactivated compressor, and without generating electrical power at the electric motor from the deactivated compressor.

In this way, transient boost response of a compound boosted engine is improved by reducing delays in the activation of an electric supercharger compressor staged upstream or downstream of a turbocharger compressor. The technical effect of commanding the electric supercharger bypass valve closed during low load conditions, when the supercharger compressor is not commanded to rotate via an electric motor, is that all intake air may be directed through a bypass passage housing the supercharger compressor. By enabling the compressor to freewheel during the flow of air there-through, the airflow diverted through the supercharger compressor may be advantageously used to raise a pressure ratio across the supercharger. By then activating the electric motor when there is a transient increase in torque demand, the supercharger compressor can be spun up from the stand-by mode, and a pressure ratio across the supercharger can be rapidly increased. By commanding the bypass valve closed long before the supercharger compressor is enabled, communication and mechanical delays incurred during the transition of the bypass valve from the open to the closed state are reduced. In addition, the reduction in the duty cycle of events that use high current to slam the valve closed may improve the durability and lift of the valve. By selectively closing the valve based on the effect of the valve closure on fuel economy, transient boost response is improved without causing unwanted air flow restriction and without incurring an unintended fuel penalty. Overall, a time to torque for a boosted engine is improved.

One example method for a boosted engine comprises: during selected low load conditions when an electrically-driven compressor coupled to a turbine-driven compressor is not activated, commanding a bypass valve closed to direct intake air to an engine via the deactivated compressor. In the preceding example, additionally or optionally, the electrically-driven compressor being deactivated includes no electrical power being provided to an electric motor coupled to the electrically-driven compressor, and no electrical power being generated by the electric motor. In any or all of the preceding examples, additionally or optionally, the method further comprises adjusting a counter electromotive force applied by an alternator coupled to the electric motor to enable freewheeling of the electrically-driven compressor. In any or all of the preceding examples, additionally or optionally, the closing is in anticipation of a tip-in from the selected low load conditions to an engine operating condition where boost assistance from the electrically-driven compressor is required. In any or all of the preceding examples, additionally or optionally, the selected low load conditions include low load conditions where engine fuel economy with the bypass valve closed and the electrically-driven compressor deactivated is higher than the engine fuel economy with the bypass valve open and the electrically-driven compressor deactivated. In any or all of the preceding examples, additionally or optionally, the selected low load conditions include engine speed increasing from rest to a first threshold speed and decreasing from the first threshold speed to a second threshold speed, and concurrently, engine load increasing from a first load to a first threshold load, and then decreasing from the first threshold load to a second load, the second load lower than the first load. In any or all of the preceding examples, additionally or optionally, a rate of the increasing engine speed from rest to a first threshold speed is higher than the rate of decreasing engine speed from the first threshold speed to the second threshold speed, and wherein a rate of the increasing engine load from the first load to the first threshold load is higher than the rate of the decreasing engine load from the first threshold load to the second load. In any or all of the preceding examples, additionally or optionally, the turbine-driven compressor is coupled in an intake passage, and wherein the electrically-driven compressor is coupled in a bypass passage, the bypass passage coupled to the intake passage upstream of the bypass valve. In any or all of the preceding examples, additionally or optionally, directing intake air to the engine via the deactivated compressor includes diverting all the intake air from the intake passage into the bypass passage, and flowing all the intake air from the bypass passage to the engine upon passage through the deactivated electrically-driven compressor. In any or all of the preceding examples, additionally or optionally, the turbine-driven compressor is staged upstream of the electrically-driven compressor, and wherein the selected low load conditions include the electrically-driven compressor not being choke limited. In any or all of the preceding examples, additionally or optionally, the method further comprises monitoring a speed of the electrically-driven compressor during the directing of intake air to the engine via the deactivated compressor; and indicating that the bypass valve is stuck at least partially open responsive to the monitored speed being lower than a threshold speed after commanding the bypass valve closed.

Another example method for a boosted engine comprises: prior to an anticipated increase in torque demand, selectively raising a pressure ratio across an electric supercharger by diverting intake air through a deactivated compressor of the electric supercharger from downstream of a deactivated turbocharger compressor. In the preceding example, additionally or optionally, the diverting includes closing a bypass valve coupled in an intake passage downstream of the turbocharger compressor to divert all of the intake air to engine cylinders via a bypass housing the electric supercharger. In any or all of the preceding examples, additionally or optionally, the selectively raising includes closing the bypass valve in an engine speed-load region where fuel economy with the bypass valve closed is higher than a threshold, the engine speed-load region mapped by overlaying an engine brake specific fuel consumption map with the ESBV valve closed with one where it is open. In any or all of the preceding examples, additionally or optionally, the method further comprises, responsive to an actual increase in torque demand, while maintaining the bypass valve closed, activating the supercharger compressor to further raise the pressure ratio based on the increased torque demand. In any or all of the preceding examples, additionally or optionally, the method further comprises indicating that the bypass valve is stuck open responsive to supercharger compressor speed being lower than a threshold during the diverting intake air. In any or all of the preceding examples, additionally or optionally, the diverting of the intake air through the deactivated compressor includes freewheeling the deactivated compressor of the electric supercharger without providing electrical power from an electric motor to the deactivated compressor, and without generating electrical power at the electric motor from the deactivated compressor.

Another example vehicle system comprises an engine; a branched intake passage system including a common upstream intake passage branching into first and second, parallel branches, and rejoining into a common downstream intake passage; a twin turbocharger including a first intake compressor in the first branch, driven by a first exhaust turbine, and a second intake compressor in the second branch, driven by a second exhaust turbine; a twin supercharger including a third intake compressor driven by a first electric motor, the third intake compressor housed in a first bypass passage bypassing the common downstream intake passage, and a fourth intake compressor driven by a second electric motor, the fourth intake compressor housed in a second bypass passage bypassing the common downstream intake passage, the first bypass and second bypass parallel to each other and to the common downstream passage; a bypass valve coupled in the common downstream passage, downstream of an inlet of each of the first and second bypass passages; and a controller with computer readable instructions stored on non-transitory memory for: while operating the engine with each of the first, second, third, and fourth intake compressors deactivated, selectively closing the bypass valve to direct all intake air to the engine via a combination of the first and second branches, and then via a combination of the first and second bypass passages, while bypassing the common downstream passage, the selectively closing based on engine fuel economy with the bypass valve closed relative to bypass valve open; and responsive to an increase in torque demand, maintaining the bypass valve closed while activating the third and fourth compressors. In the preceding example, additionally or optionally, the selectively closing is further based on a choke limit of each of the third and fourth intake compressor. In any or all of the preceding examples, additionally or optionally, the system further comprises a sensor for estimating a rotation speed of at least one of the third and fourth compressor, and the controller includes further instructions for indicating degradation of the bypass valve responsive to a lower than threshold change in rotation speed of the at least one of the third and fourth compressor following the selectively closing, the indicating degradation including indicating that the bypass valve is stuck open.

In another representation, the vehicle system is a hybrid vehicle system. In yet another representation, the vehicle system is a vehicle system configured with autonomous driving capabilities. In still another representation, the bypass valve diagnostic is performed while operating the vehicle in an autonomous mode.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A method for a boosted engine, comprising:
  during selected low load conditions when an electrically-driven compressor coupled to a turbine-driven compressor is not activated, commanding a bypass valve closed to direct intake air to an engine via the deactivated electrically-driven compressor, wherein the electrically-driven compressor being deactivated includes no electrical power being provided to an electric motor coupled to the electrically-driven compressor, and no electrical power being generated by the electric motor; and adjusting a counter electromotive force applied by an alternator coupled to the electric motor to enable freewheeling of the electrically-driven compressor.

2. The method of claim 1, wherein the closing is in anticipation of a tip-in from the selected low load conditions to an engine operating condition where boost assistance from the electrically-driven compressor is required.

3. The method of claim 1, wherein the selected low load conditions include low load conditions where engine fuel economy with the bypass valve closed and the electrically-driven compressor deactivated is higher than engine fuel economy with the bypass valve open and the electrically-driven compressor deactivated.

4. The method of claim 1, wherein the selected low load conditions include engine speed increasing from rest to a first threshold speed and decreasing from the first threshold speed to a second threshold speed, and, concurrently, engine load increasing from a first load to a first threshold load, and then decreasing from the first threshold load to a second load, the second load lower than the first load.

5. The method of claim 4, wherein a rate of the increasing engine speed from rest to the first threshold speed is higher than a rate of decreasing engine speed from the first threshold speed to the second threshold speed, and wherein a rate of the increasing engine load from the first load to the first threshold load is higher than a rate of the decreasing engine load from the first threshold load to the second load.

6. The method of claim 1, wherein the turbine-driven compressor is coupled in an intake passage, and wherein the electrically-driven compressor is coupled in a bypass passage, the bypass passage coupled to the intake passage upstream of the bypass valve.

7. The method of claim 6, wherein directing intake air to the engine via the deactivated electrically-driven compressor includes diverting all the intake air from the intake passage into the bypass passage, and flowing all the intake air from the bypass passage to the engine upon passage through the deactivated electrically-driven compressor.

8. The method of claim 1, wherein the turbine-driven compressor is staged upstream of the electrically-driven compressor, and wherein the selected low load conditions include the electrically-driven compressor not being choke limited.

9. A method for a boosted engine, comprising:
during selected low load conditions when an electrically-driven compressor coupled to a turbine-driven compressor is not activated, commanding a bypass valve closed to direct intake air to an engine via the deactivated electrically-driven compressor, and further comprising:
monitoring a speed of the electrically-driven compressor during the directing of intake air to the engine via the deactivated electrically-driven compressor; and
indicating that the bypass valve is stuck at least partially open responsive to the monitored speed being lower than a threshold speed after commanding the bypass valve closed.

10. A method for a boosted engine, comprising:
prior to an anticipated increase in torque demand, selectively raising a pressure ratio across an electric supercharger by diverting intake air through a deactivated compressor of the electric supercharger from downstream of a deactivated turbocharger compressor.

11. The method of claim 10, wherein the diverting includes closing a bypass valve coupled in an intake passage downstream of the turbocharger compressor to divert all of the intake air to engine cylinders via a bypass housing the electric supercharger.

12. The method of claim 11, wherein the selectively raising includes closing the bypass valve in an engine speed-load region where fuel economy with the bypass valve closed is higher than a threshold, the engine speed-load region mapped by overlaying an engine brake specific fuel consumption map with the bypass valve closed onto a corresponding map with the bypass valve open.

13. The method of claim 11, further comprising, responsive to an actual increase in torque demand, while maintaining the bypass valve closed, activating the supercharger compressor to further raise the pressure ratio based on the increased torque demand.

14. The method of claim 11, further comprising indicating that the bypass valve is stuck open responsive to supercharger compressor speed being lower than a threshold during the diverting of the intake air.

15. The method of claim 10, wherein the diverting of the intake air through the deactivated compressor includes freewheeling the deactivated compressor of the electric supercharger without providing electrical power from an electric motor to the deactivated compressor, and without generating electrical power at the electric motor from the deactivated compressor.

16. A vehicle system, comprising:
an engine;
a branched intake passage system including a common upstream intake passage branching into first and second parallel branches, and rejoining into a common downstream intake passage;
a twin turbocharger including a first intake compressor in the first branch, driven by a first exhaust turbine, and a second intake compressor in the second branch, driven by a second exhaust turbine;
a twin supercharger including a third intake compressor driven by a first electric motor, the third intake compressor housed in a first bypass passage bypassing the common downstream intake passage, and a fourth intake compressor driven by a second electric motor, the fourth intake compressor housed in a second bypass passage bypassing the common downstream intake passage, the first bypass passage and the second bypass passage parallel to each other and to the common downstream passage;
a bypass valve coupled in the common downstream passage, downstream of an inlet of each of the first and second bypass passages; and
a controller with computer readable instructions stored on non-transitory memory for:
while operating the engine with each of the first, second, third, and fourth intake compressors deactivated, selectively closing the bypass valve to direct all intake air to the engine via a combination of the first and second branches, and then via a combination of the first and second bypass passages, while bypassing the common downstream passage, the selectively closing based on engine fuel economy with the bypass valve closed relative to bypass valve open; and
responsive to an increase in torque demand, maintaining the bypass valve closed while activating the third and fourth intake compressors.

17. The system of claim 16, wherein the selectively closing is further based on a choke limit of each of the third and fourth intake compressors.

18. The system of claim 16, further comprising a sensor for estimating a rotation speed of at least one of the third and fourth compressors, wherein the controller includes further instructions for indicating degradation of the bypass valve responsive to a lower than threshold change in rotation speed of the at least one of the third and fourth compressors following the selectively closing, the indicating degradation including indicating that the bypass valve is stuck open.

* * * * *